United States Patent [19]
Lee et al.

[11] Patent Number: 6,151,209
[45] Date of Patent: Nov. 21, 2000

[54] MODULAR COMPUTER ASSEMBLY HAVING SYSTEM CIRCUIT MODULE AND PERIPHERAL CIRCUIT MODULE

[75] Inventors: Ming-Wei Lee; Hung-Chang Huang, both of Taipei, Taiwan

[73] Assignee: Mitac International Corporation, Hsinchu, Taiwan

[21] Appl. No.: 09/399,139

[22] Filed: Sep. 20, 1999

[51] Int. Cl.[7] ............................ H05K 5/00; H05K 7/00
[52] U.S. Cl. .................... 361/683; 361/686; 361/724; 361/725; 361/726; 361/730; 312/223.2
[58] Field of Search .................... 361/724, 683, 361/686, 730, 725, 726; 312/223.1, 223.2; 301/796; 364/708.01, 705.01

[56] References Cited

U.S. PATENT DOCUMENTS

| | | | |
|---|---|---|---|
| 4,479,198 | 10/1984 | Romano et al. | 364/900 |
| 5,051,868 | 9/1991 | Leveraul et al. | 361/395 |
| 5,390,081 | 2/1995 | St. Pierre | 361/775 |
| 5,438,476 | 8/1995 | Steffes | 361/683 |
| 5,600,538 | 2/1997 | Xanthopoulos | 361/683 |
| 5,625,531 | 4/1997 | Padilla et al. | 361/623 |
| 5,646,823 | 7/1997 | Amori | 361/695 |
| 5,701,231 | 12/1997 | Do et al. | 361/683 |
| 5,754,396 | 5/1998 | Felcman et al. | 361/683 |
| 5,761,034 | 6/1998 | Chu | 361/687 |
| 5,774,337 | 6/1998 | Lee et al. | 361/725 |
| 5,784,252 | 7/1998 | Villa et al. | 361/683 |
| 5,793,616 | 8/1998 | Aubuchon et al. | 361/784 |
| 5,992,955 | 11/1999 | Yang | 312/265.6 |
| 5,996,831 | 12/1999 | Teok | 220/230 |
| 6,018,456 | 1/2000 | Young et al. | 361/684 |

*Primary Examiner*—Gerald Tolin
*Assistant Examiner*—Tung Minh Bui
*Attorney, Agent, or Firm*—Baker Botts, L.L.P.

[57] ABSTRACT

A modular computer assembly includes a peripheral circuit module having a first housing half, a connecting circuit board mounted inside the first housing half, and peripheral interface circuit units mounted on the connecting circuit board. The connecting circuit board has peripheral interface connectors to connect with the peripheral interface circuit units, and a mother board connector mounted thereon. The mother board connector is electrically connected to the peripheral interface connectors. The assembly further has a system circuit module including a second housing half and a mother board mounted inside the second housing half. The mother board has an insert edge insertable into the mother board connector to establish electrical connection with the peripheral circuit module. The second housing half complements with the first housing half to form a computer housing when the system circuit module and the peripheral circuit module are assembled.

5 Claims, 7 Drawing Sheets

MODULAR COMPUTER ASSEMBLY HAVING SYSTEM CIRCUIT MODULE AND PERIPHERAL CIRCUIT MODULE

BACKGROUND OF THE INVENTION

1. Field of the Invention

The invention relates to a computer assembly, more particularly to a modular computer assembly including a system circuit module and a peripheral circuit module.

2. Description of the Related Art

It is known in the art to provide a computer with peripheral interface devices in connection with a mother board of a system circuit unit. Typically, peripheral interface devices are directly mounted on the mother board, which has a central processing unit, in perpendicular positions by inserting into electrical connectors which are electrically connected to circuit traces formed on the mother board. As the central processing unit and the peripheral interface devices are all mounted to the mother board, difficulties or inconveniences are encountered when upgrading the computer due to the complicated circuit traces and the limited space on the mother board. Generally, one must rely on a technician who is skilled in the wiring formed by the circuit traces on the mother board in order to upgrade a computer.

SUMMARY OF THE INVENTION

An object of the present invention is to provide a modular computer assembly including a system circuit module and a peripheral circuit module which are easily separable from one another, thus facilitating an upgrading task of the computer assembly.

According to the present invention, a modular computer assembly comprises: a peripheral circuit module including a first housing half, a connecting circuit board mounted inside the first housing half, and peripheral interface circuit units mounted on the connecting circuit board, the connecting circuit board having peripheral interface connectors to connect with the peripheral interface circuit units, and a mother board connector mounted thereon, the mother board connector being connected to the peripheral interface connectors; a system circuit module including a second housing half, a mother board mounted inside the second housing half, the mother board having an insert edge insertable into the mother board connector, the second housing half being capable of complementing with the first housing half to form a computer housing; and fastening means for fastening together the first and second housing halves.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
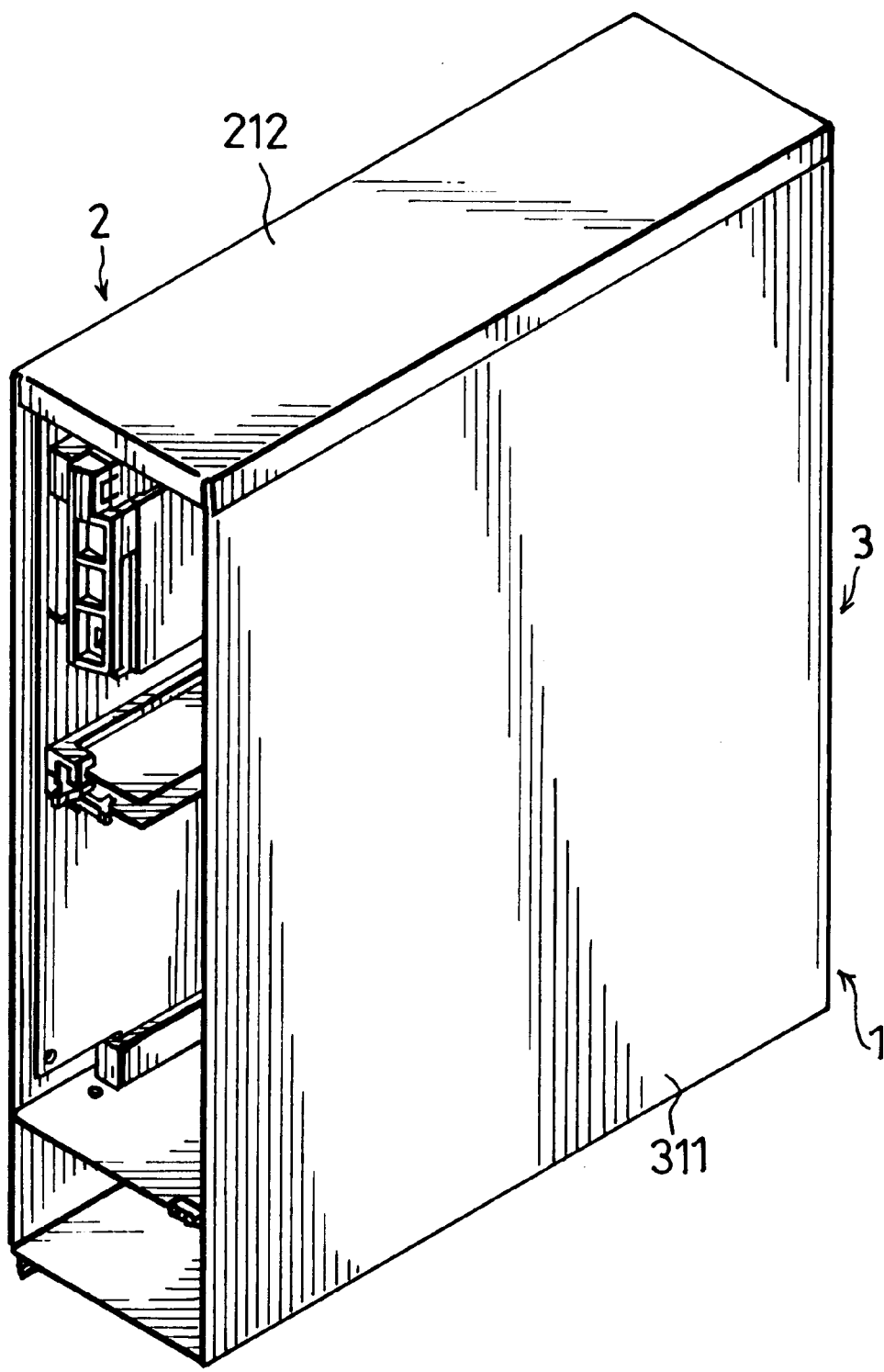
FIG. 1 is a perspective view of a modular computer assembly embodying the present invention.
Figure 2:
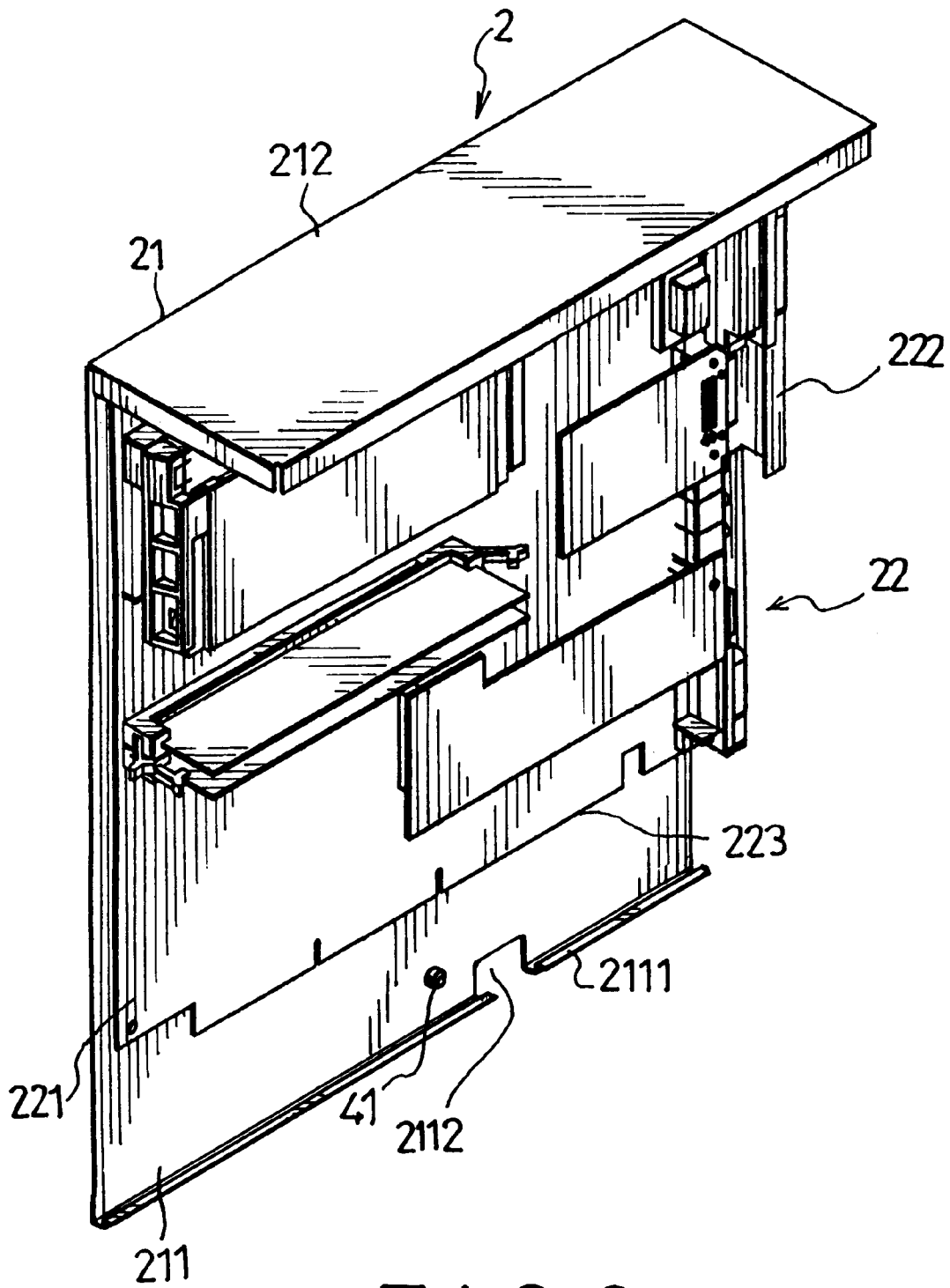
FIG. 2 is a perspective view of a system circuit module of the modular computer assembly of FIG. 1.
Figure 3:
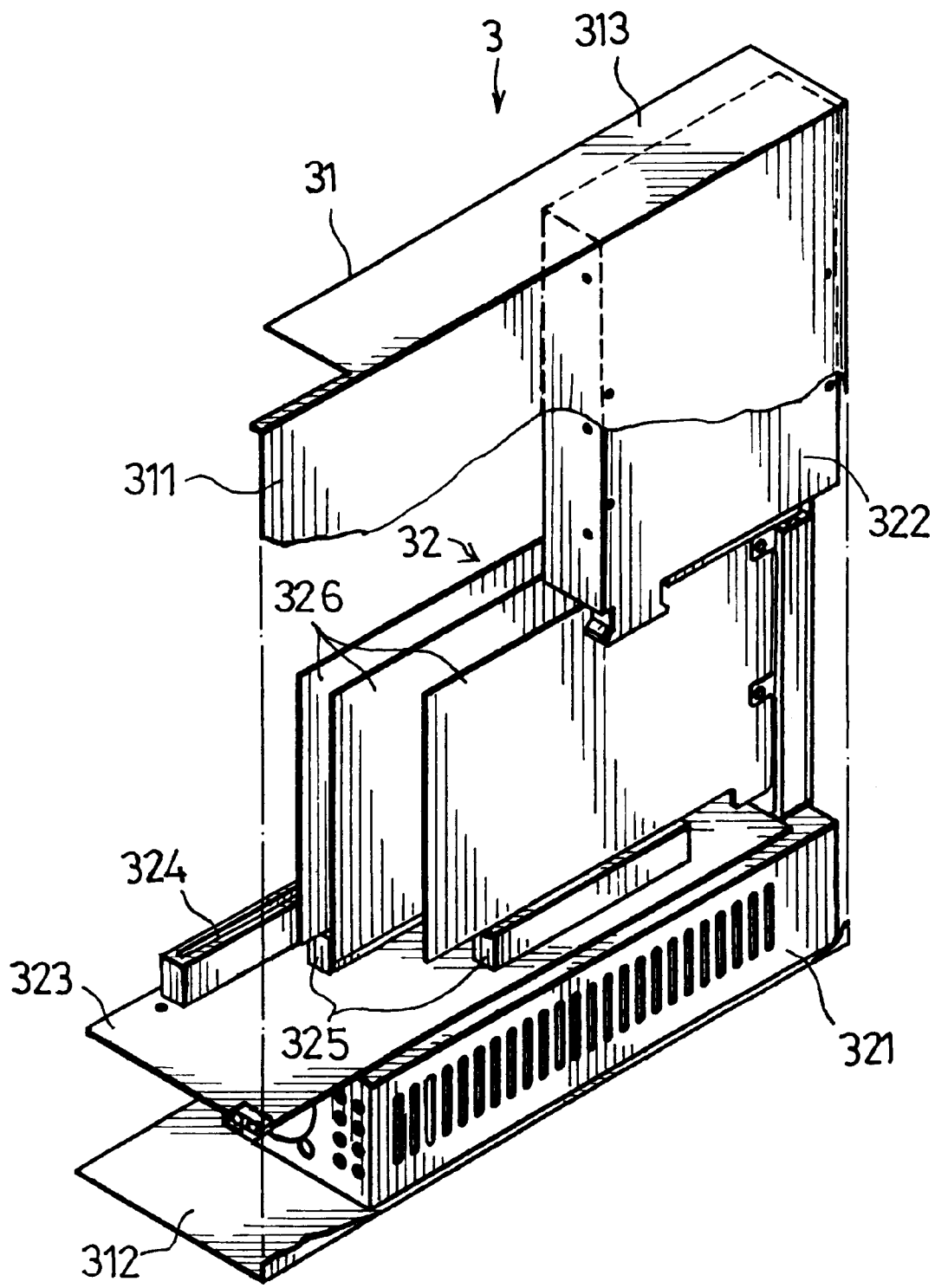
FIG. 3 is a perspective view of a peripheral circuit module of the modular computer assembly of FIG. 1.
Figure 4:
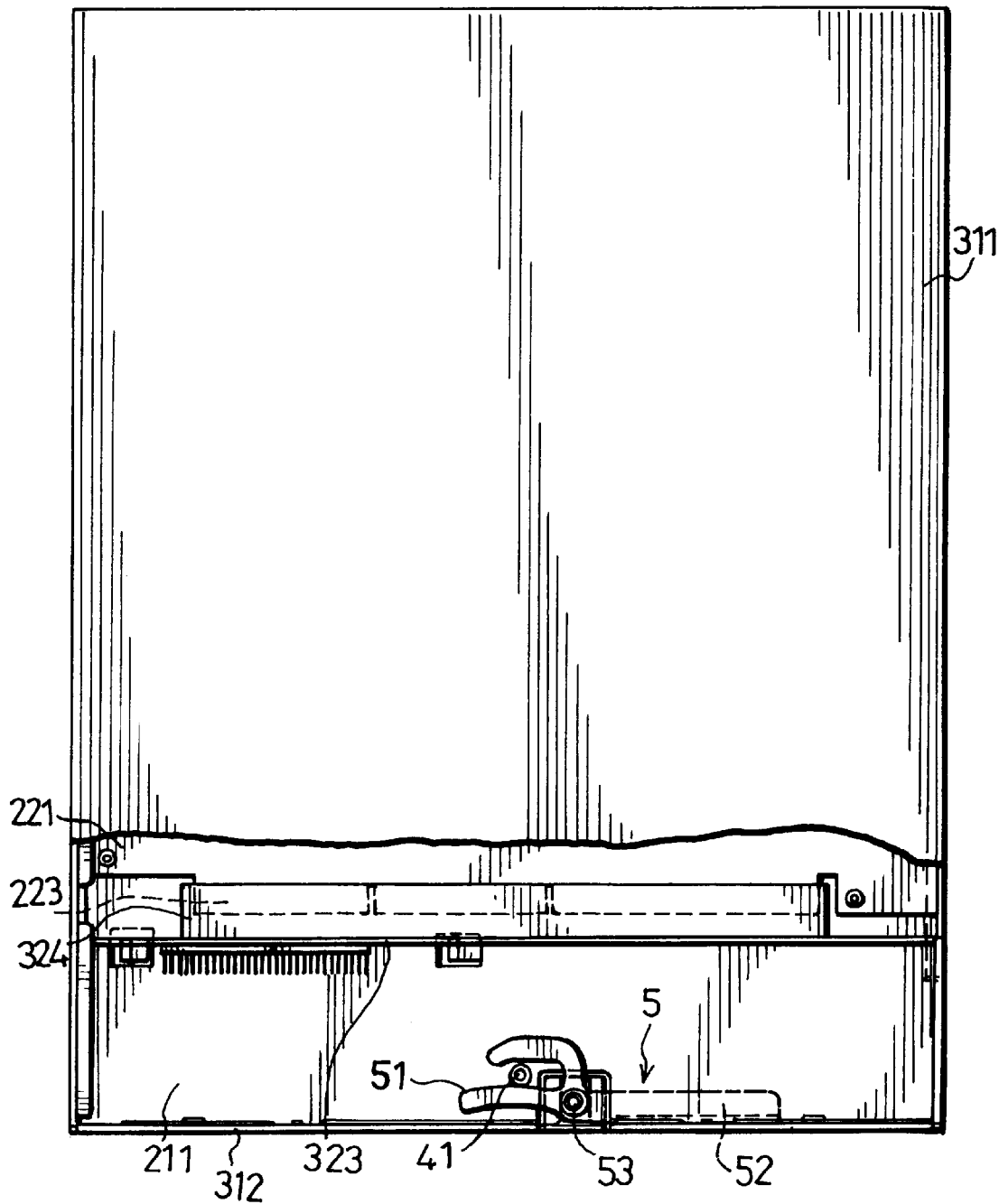
FIG. 4 is a top plan view of the modular computer assembly.
Figure 5:
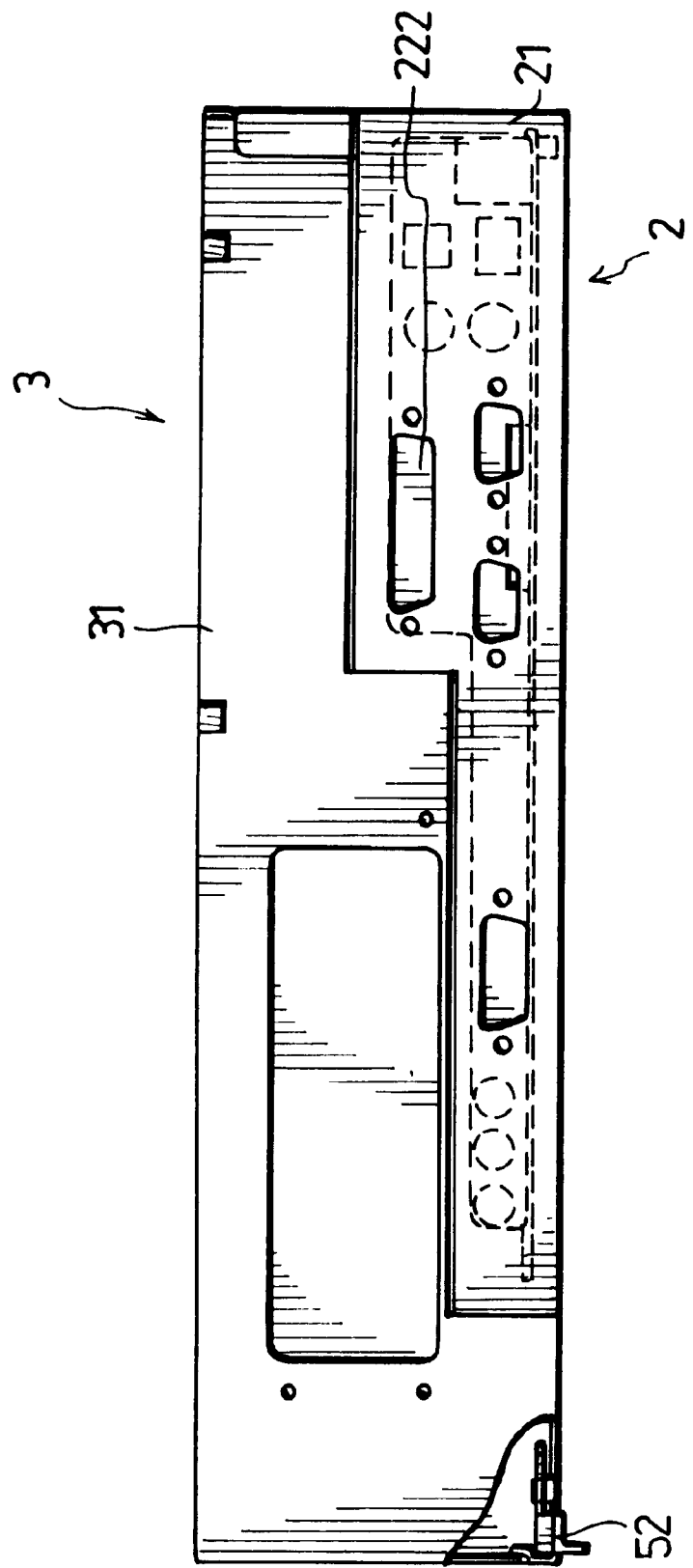
FIG. 5 is a side elevation view of the modular computer assembly.

As shown in FIGS. 1 to 5, a modular computer assembly 1 embodying the present invention comprises a system circuit module 2 and a peripheral circuit module 3. The peripheral circuit module 3 includes a first housing half 31 and a peripheral circuit device 32. The first housing half 31 has a first wall 311 and a second wall 312 which extends from one side of the first wall 311 at a right angle. The first wall 311 is broader than the second wall 312. A third wall 313 extends from the other side of the first wall 311 in parallel to the second wall 312.

The peripheral circuit device 32 includes a power supply unit 321, a peripheral equipment 322, a connecting circuit board 323, and a plurality of peripheral interface circuit units 326. The peripheral equipment 322 is known and includes components, such as a floppy disk drive, a CD-ROM disk drive, etc. The connecting circuit board 323 is mounted on the second wall 312 in a parallel position. A mother board connector 324 and a plurality of peripheral interface connectors 325 are mounted on the connecting circuit board 323 and are connected to the power supply unit 321. The mother board connector 324 is further connected electrically to the peripheral interface connectors 325. The peripheral interface circuit units or cards 326 are mounted on the connecting board 323 by inserting into the peripheral interface connectors 325.

The system circuit module 2 includes a second housing half 21 which has a first wall 211 and a second wall 212 extending from one side of the first wall 211 at a right angle. The system circuit module 2 further includes a system circuit unit 22 which has a mother board 221 and an interface port 222. The mother board 221 has an insert edge 223 which can be inserted into the mother board connector 324 provided on the connecting circuit board 323 to establish electrical connection with the peripheral circuit module. The insert edge 223 of the mother board 221 is electrically connected to electronic components disposed on the mother board 221, such as an address bus, a data bus, an instruction bus, etc. The interface port 222 is electrically connected to signal output and input ports of the mother board 221.

The modular computer assembly 1 further has fastening means for fastening together the first and second housing halves 31, 21. The fastening means includes a stud 41 mounted on the second housing half 21, and a lever 5 mounted on the first housing half 31. The stud 41 projects inwardly from an inner surface of the first wall 211 of the second housing half 21 from a location between a side 2111 of the first wall 211 and the insert edge 223 of the mother board 221. The side 2111 of the first wall 211 is provided with a notch 2112.

Figure 6:
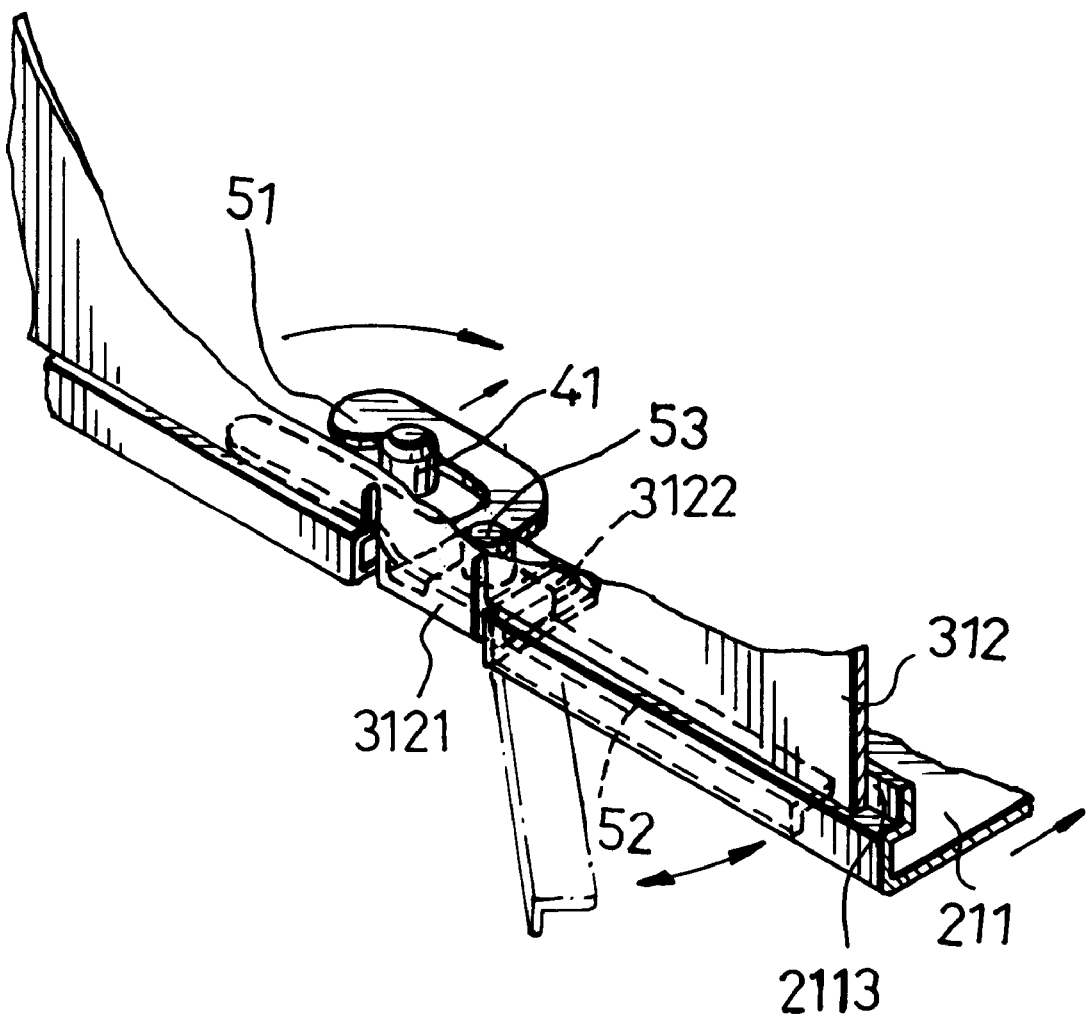
FIG. 6 is a segmented perspective view to illustrate fastening means of the modular computer assembly.

The lever 5 is mounted on the second wall 312 of the first housing halve 31 that will adjoin the side 2111 of the first wall 211 of the second housing half 21 during assembly of the system circuit module 2 and the peripheral circuit module 3. As best shown in FIG. 6, the second wall 312 has a tab 3121 which projects into the notch 2112 of the first wall 211 of the second housing half 21 from one side of the second wall 312. The tab 3121 has an angled part 3122. The lever 5 has a stud engaging end 51 and an opposite lever handle 52 and is mounted on a lever shaft 53 which in turn is fixed to the angled part 3122 of the tab 3121. The lever shaft 53 is parallel to the stud 41.

Figure 7:
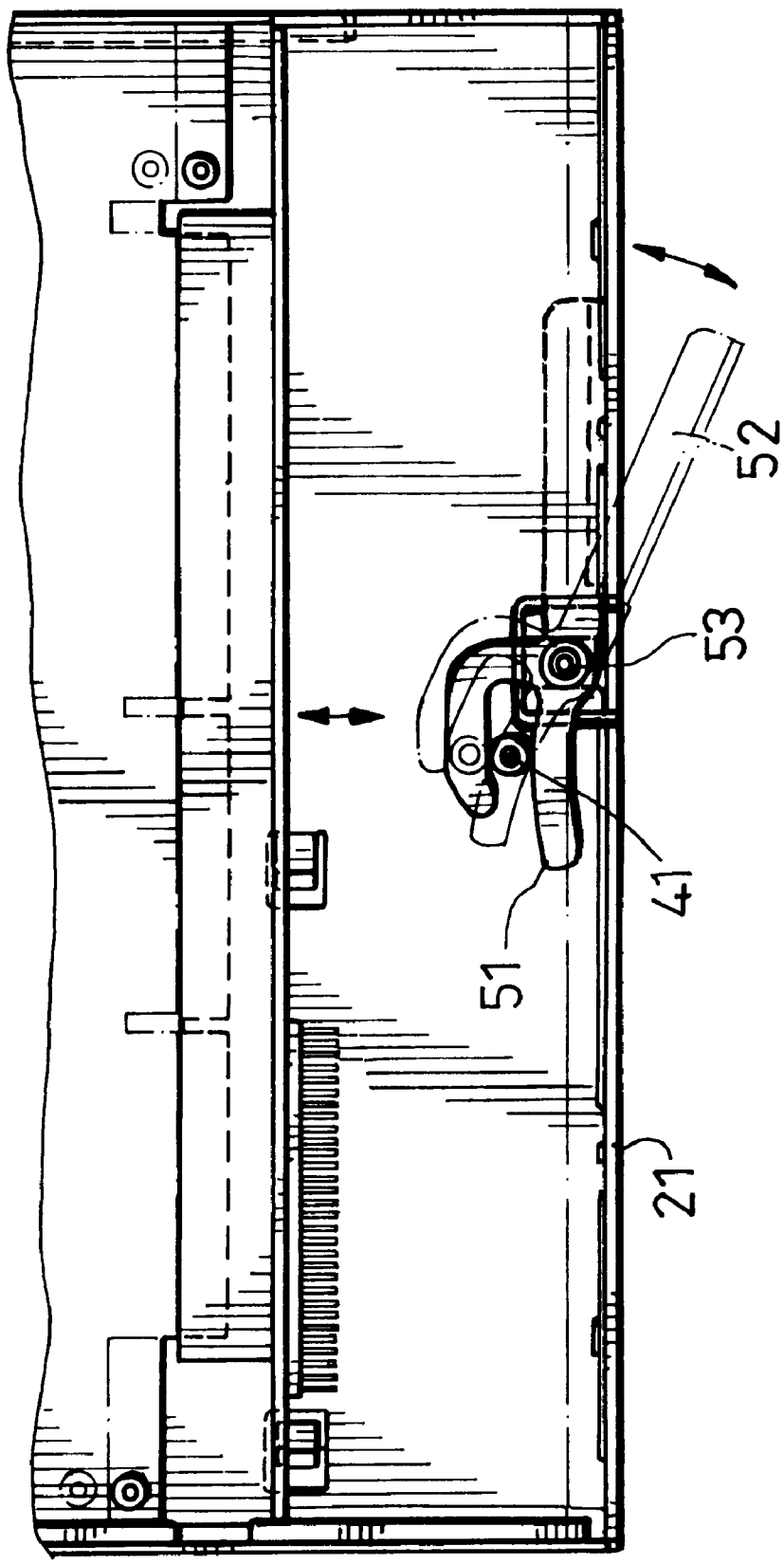
FIG. 7 is a segmented plan view to illustrate the operation of the fastening means.

When the system circuit module 2 and the peripheral circuit module 3 are assembled, the first and second housing halves 31, 21 complement one another and form a computer housing. In assembly, the peripheral circuit module 3 is put onto the system circuit module 2 in such a manner that the second wall 212 of the second housing half 21 is placed outwardly of the third wall 313 of the first housing half 31 (as best shown in FIG. 1), and the second wall 312 of the first housing half 31 is placed outwardly of a flange 2113 projecting from the first wall 211 of the second housing half 21 (as best shown in FIG. 6). The first wall 311 of the first housing half 31 is parallel to the first wall 211 of the second housing half 21, whereas the second wall 312 of the first housing half 31 is parallel to the second wall 212 of the second housing half 21. The connecting circuit board is parallel to the second wall 312 of the first housing half 31. The mother board 221 is parallel to the first wall 211 of the second housing half 21. The angled part 3122 of the tab 3121 extends into the notch 2112 of the first wall 211 of the second housing half 21 and is substantially coplanar with the first wall 211. The stud 41 is received in the stud engaging end 51 of the lever 5, which is forked. When the lever handle 52 is turned inward, the stud 41 is pulled toward the second wall 312 as shown in FIG. 7. In this situation, the insert edge 223 of the mother board 221 is inserted into the mother board connector 324.

It is known that computers are upgraded by replacing old electronic components, such as older central processing units, older memory devices, older display cards, with new ones. As these components are disposed in the system circuit module 2, the modular computer assembly 1 can be upgraded easily by simply separating the system circuit module 2 from the peripheral circuit module 3 for replacement.

While the present invention has been described in connection with what is considered the most practical and preferred embodiment, it is understood that this invention is not limited to the disclosed embodiments but is intended to cover various arrangements included within the spirit and scope of the broadest interpretation so as to encompass all such modifications and equivalent arrangements.

What is claimed is:

1. A modular computer assembly comprising:

a peripheral circuit module including a first housing half, a connecting circuit board mounted inside said first housing half, and peripheral interface circuit units mounted on said connecting circuit board, said connecting circuit board having peripheral interface connectors to connect with said peripheral interface circuit units, and a mother board connector mounted thereon, said mother board connector being electrically connected to said peripheral interface connectors;

a system circuit module including a second housing half, a mother board having an insert edge insertable into said mother board connector to establish electrical connection with said peripheral circuit module, said second housing half complementing with said first housing half to form a computer housing; and fastening means for fastening together said first and second housing halves, wherein said mother board and said peripheral interface circuit units are perpendicular to said connecting circuit board, and wherein each of said first and second housing halves includes a first wall and a second wall right-angled to said first wall, said first wall being broader than said second wall, said first walls of said first and said second housing halves being substantially parallel and said second walls of said first and second housing halves being substantially parallel after said first and second housing halves are assembled together to form said computer housing, said connecting circuit board being mounted on said second wall of said first housing half in parallel therewith, said mother board being parallel to said first wall of said second housing half.

2. The modular computer assembly as claimed in claim 1, wherein said first wall of said second housing half has one side to adjoin with said second wall of said first housing half, said side being parallel to said insert edge of said mother board, said insert edge being inserted into said mother board connector when said side abuts against said second wall of said first housing half.

3. The modular computer assembly as claimed in claim 2, wherein said fastening means comprises a stud projecting inwardly and perpendicularly from an inner surface of said first wall of said second housing half from a location between said insert edge and said side of said first wall of said second housing half, and a lever having a stud engaging end engageable with said stud and mounted pivotally on said second wall of said first housing half, said lever being turnable to move said stud toward or away from said second wall of said first housing half so as to move said first wall of said second housing half relative to said second wall of said first housing half, said lever further having a lever handle extending out of said first housing half.

4. The modular computer assembly as claimed in claim 3, wherein said system circuit module further has an interface port electrically connected to said mother board for signal input and signal output purposes.

5. The modular computer assembly as claimed in claim 4, wherein said peripheral circuit module further has a power supply unit mounted inside said first housing half, said power supply unit being electrically connected to said peripheral interface connectors and said mother board connector.

* * * * *